United States Patent [19]

Gingerich et al.

[11] 4,348,224

[45] Sep. 7, 1982

[54] METHOD FOR PRODUCING COBALT METAL POWDER

[75] Inventors: Richard G. W. Gingerich; Clarence D. Vanderpool; Richard A. Scheithauer; Joseph E. Ritsko, all of Towanda, Pa.

[73] Assignee: GTE Products Corporation, Stamford, Conn.

[21] Appl. No.: 300,868

[22] Filed: Sep. 10, 1981

[51] Int. Cl.³ .............................................. C22B 23/04
[52] U.S. Cl. ................................. 75/0.5 AA; 75/109; 75/119
[58] Field of Search .................. 75/0.5 AA, 109, 119, 75/103

[56] References Cited

U.S. PATENT DOCUMENTS

| | | | |
|---|---|---|---|
| 4,214,894 | 7/1980 | Ritsko et al. | 75/119 |
| 4,214,895 | 7/1980 | Gingerich et al. | 75/119 |
| 4,233,063 | 11/1980 | Ritsko et al. | 75/119 |

*Primary Examiner*—W. Stallard
*Attorney, Agent, or Firm*—Robert E. Walter

[57] ABSTRACT

In a process for producing fine size cobalt metal powder from scrap material containing brazing compositions, the scrap is digested with hydrochloric acid to produce an aqueous cobalt acid chloride solution containing copper and silver ions which ions are removed by cementation with iron to result in a cobalt chloride solution which is processed to fine cobalt metal powder.

7 Claims, No Drawings

METHOD FOR PRODUCING COBALT METAL POWDER

TECHNICAL FIELD

This invention relates to an improved process for producing cobalt metal powder from scrap material of the type including cobalt and silver or copper.

BACKGROUND

U.S. Pat. No. 4,218,240 to Gingerich, et al. relates to a process wherein cobalt is recovered by treating aqueous solutions containing ammonia and cobalt irons with sufficient amount of an acid in the presence of a catalyst to convert the cobalt irons to a cobalt hexammine ion which is precipitated and separated from the resulting solution. The precipitate is dissolved in an aqueous solution to form a relatively pure solution which is treated with a metallic hydroxide to form a cobalt containing precipitate which is reduced to form fine particles of cobalt.

According to the above basic process, some copper may be removed during the normal purification steps during filtration of the aqueous cobaltic hexammine solution. If small amounts of ammonium chloride and ammonium hydroxide are present in the aqueous hexammine cobalt chloride solution, some of the copper remains dissolved and contaminates the cobalt hexammine precipitate.

Typically the scrap material contains significant quantities of copper and silver which are commonly used in brazing alloys. In this case, the normal purification step may be achieved with difficulty due to the presence of large quantities of solids.

SUMMARY OF THE INVENTION

By the improvement of the present invention, both copper and silver which are typically present in brazes can be desirably removed with a single treatment without adversely effecting the cobalt concentration or adding additional contaminates to the process stream which will require subsequent removal.

In accordance with the present invention, there is provided a process for producing fine particle size cobalt metal powder from scrap material comprising cobalt and copper or silver, said process comprising digesting said scrap material in aqueous hydrochloric acid to produce an aqueous acid cobalt chloride solution containing copper ions or silver ions, contacting said aqueous acid cobalt chloride solution at a pH of from about 2 to about 4 with a sufficient amount of iron metal to cement said copper or silver with said iron to form an insoluble mixture and a resulting aqueous acid cobalt chloride solution, complexing cobalt present in said aqueous acid cobalt chloride solution with ammonia to form a cobalt ammine chloride solution, forming a cobalt containing precipitate, and reducing said cobalt containing precipitate to form a cobalt metal powder.

DETAILED DESCRIPTION

The present invention is directed to a process for recovering cobalt in the form of cobalt powder from a cobalt source. The present invention is particularly suited to the recovery of cobalt from scrap material containing cemented refractory metal carbides and brazing compositions of silver and copper. The binder most commonly used for refractory metal carbide is cobalt.

The level of cobalt depends upon the end use of the cemented carbide but most commercial cemented refractory metal carbides contain from about 4 to 25% by weight cobalt. The scrap material is digested in an aqueous hydrochloric acid solution for a sufficient time to produce an aqueous acid cobalt chloride solution. Preferably an azeotropic hydrochloric acid solution is used which comprises about 20 percent hydrochloric acid and has a boiling point of about 110° C. While both higher and lower concentrations of acid than the azeotrope can be initially used, water is given off until the azeotrope is reached when weaker acids are used and hydrochloric acid is given off when stronger acids than the azeotropic acids are used. As a result, the azeotropic concentration is reached after prolonged digestion of the scrap. Preferably, an excess of hydrochloric acid is used in an amount greater than at least 200 percent of the amount theoretically required to react with the scrap material.

After digestion under the above conditions, the refractory metal carbide is depleted of cobalt, that is it generally contains less than about 0.5 percent by weight cobalt. The resulting solution contains a variety of anions and cations such as iron, manganese, copper, aluminum, chromium, magnesium, nickel, calcium, sodium, potassium, silver, etc. Preferably cobalt is present as the major cation and chloride as the major anion. With other cations and anions being present in minor proportions. Typical solutions have a cobalt concentration of from 40 to about 150 grams per liter in about 1 to about 6 molar hydrochloric acid solution. Less than about 10 grams per liter of copper and less than about 10 grams per liter of silver are present in the solution. The solid portion which comprises the refractory metal carbide may be conveniently separated from the aqueous acid cobalt chloride solution containing the additional anions and cations.

In accordance with the principles of the present invention, the aqueous acid cobalt chloride solution after digestion with hydrochloric acid and prior to complexing with ammonia, is contacted at a pH of from about 2 to about 4 with a sufficient amount of iron metal to result in the cementation of said copper or silver with the iron to form an insoluble mixture and a resulting aqueous acid cobalt chloride solution. Generally, addition of iron to the aqueous acid cobalt chloride mixture at pH values below about 2.0 result in the reaction of iron with the hydrochloric acid to give hydrogen and ferrous chloride. Addition of iron at pH values above about 4, will result in the precipitation of cobaltous hydroxide from the mixture. The iron acts as a scavenger in that copper and silver in solution plates or combines with the solid iron particles to give a mixture of iron in the silver or copper.

Although steel sheet plates copper and silver, iron powder is most effective due to faster reaction time which is apparently due to the greater reaction surface available and better distribution in the mixture.

In the case when iron is used in powder form, at least about one part by weight iron should be used per about 2 parts of weight silver and about 1.5 parts of weight copper present in solution. More preferably at least about one part by weight iron per about 1.93 parts by weight silver and about 1.14 parts of weight copper present in solution should be used to cement both copper and silver from solution. The silver is preferentially cemented with the iron when silver and copper ions are present in solution and less than the required amount of iron is added to result in the cementation of substantially all of the copper and silver. It has been found that iron powder may be slowly added to first to preferentially cement the silver, separate the cemented iron and silver, and add additional amounts of iron to cement the copper so as to achieve a separation of silver and copper from the cobalt solution.

Iron is particularly suited for removing copper and silver from the cobalt solution containing other anions and cations. An excess of metals more electropositive than iron, e.g. aluminum or zinc will precipitate cobalt while a metal less electropositive than iron but more electropositive than copper, e.g. cobalt and nickel, do not cement copper from solution.

The resulting aqueous acid cobalt chloride solution which has been deposited in silver and copper values is then complexed with ammonia to form a cobalt ammine chloride solution. As set forth in U.S. Pat. No. 4,218,240, which is incorporated by reference into the present application, the cobalt iron is converted to the cobaltic hexammine complex ion in the presence of a catylist. Due to the addition of ammonium hydroxide, the pH of the aqueous acid cobalt chloride solution is increased and a variety of other cations precipitate. The precipitate is separated from the cobalt ammine chloride solution to give a purified aqueous cobaltic hexammine halide solution. Next, the solution is acidified in the presence of halide irons to form a cobaltic hexammine halide precipitate. The precipitate may be separated from remaining solution by conventional liquid-solid separation processes to give an even more purified cobaltic hexammine halide. Next, the precipitated cobalt hexammine halide is dissolved in water and treated so as to form a cobalt containing precipitate. The cobalt containing precipitate is reduced to form a cobalt metal powder. These later steps are also described in U.S. Pat. No. 4,218,240.

EXAMPLE 1

Scrap material containing about 454 parts of rectangular-shaped pieces of cemented carbide having dimensions of less than about one square inch and containing copper and silver in an amount typically present as a braze associated with the carbide is digested under reflex for about seven days with about 717 parts of azeotropic (20.24 percent HCl). At the end of this time, the carbide is in the form of a depleted skeleton with the braze and cobalt in solution. The pH of the resulting aqueous acid solution is adjusted to about 3 and iron metal powder, about 7 grams is added to the solution. The resulting mixture was stirred for about 3 hours and filtered. The filtrate was depleted in copper and silver values while the solid portion contained silver and copper coated on the iron particles. The filtrate was then processed according to the process described in Example 1 of U.S. Pat. No. 4,218,240.

EXAMPLE 2

To 100 milliliters of an aqueous cobalt chloride mixture which contained 120 grams of cobalt per liter, 3.2 grams of copper per liter, and 0.23 grams of silver per liter at a pH value of 3.5 about 0.60 grams of iron powder were added. The resulting mixture was stirred for three hours at 60° C. Next, the mixture was filtered on a Buchner funnel, and the resulting filtrate was found to contain 120 grams of cobalt per liter, 0.008 grams of copper per liter and less than 0.002 grams of silver per liter.

EXAMPLE 3

A cobalt chloride mixture containing soluble copper and silver is treated with various amounts of iron according to the following table with the results shown in the table.

TABLE II

| Test No. | Fe gms. | Co gpl | Cu gpl | Ag gpl |
|---|---|---|---|---|
| 1 | — | 88 | 4.1 | 0.37 |
| 2 | 0.052 | 82 | 4.6 | 0.084 |
| 3 | 0.076 | 81 | 3.7 | 0.003 |
| 4 | 0.10 | 84 | 2.2 | 0.002 |
| 5 | 0.5 | 81 | 0.004 | <0.002 |

As illustrated above, the silver is preferentially depleted prior to the copper being depleted when small amounts of iron are utilized.

Although the present invention has been described in conjunction with specific embodiments, it is to be understood that modifications and variations may be made therefrom without departing from the spirit and scope of the invention.

INDUSTRIAL APPLICABILITY

The method described and claimed herein is particularly useful in the formation of extrafine particle size cobalt powders of high purity, which are useful, for example, as starting material formation of cemented carbides.

We claim:

1. A process for producing fine particle size cobalt metal powder from scrap material comprising cobalt and copper or silver, said process comprising digesting said scrap material in aqueous hydrochloric acid to produce an aqueous acid cobalt chloride solution containing copper ions or silver ions, contacting said aqueous acid cobalt chloride solution at a pH of from about 2 to about 4 with a sufficient amount of iron metal to result in the cementation of said copper ions or silver ions with said iron to form an insoluble mixture comprising iron and copper or silver and a resulting aqueous acid cobalt chloride solution, complexing cobalt present in said aqueous cobalt chloride solution with ammonia to form a cobalt ammine chloride solution, forming a cobalt containing precipitate, and reducing said cobalt containing precipitate to form a cobalt metal powder.

2. A process for producing fine particle size cobalt metal according to claim 1 wherein said scrap material comprises cemented metal carbide having cobalt metal binder having copper and silver present therein as a braze compound, wherein said digesting of said cemented metal carbide is performed for a sufficient period of time to dissolve said cobalt metal binder and produce a solid portion comprising metal carbide and said aqueous acid cobalt chloride solution containing other cations including copper and silver, separating said solid portion from said aqueous acid cobalt chloride solution prior to said contacting step.

3. A process for producing fine particle size cobalt metal powder according to claim 2 wherein said insoluble mixture is separated from said resulting aqueous acid cobalt chloride solution prior to complexing.

4. A process for producing fine particle size cobalt metal powder according to claim 2 wherein said contacting removes substantially all of said silver and copper.

5. A process for producing fine particle size cobalt metal according to claim 2 wherein said contacting preferentially removes substantially all of said silver.

6. A process for producing fine particle size cobalt metal powder according to claim 2 wherein said cobalt chloride solution contains cobalt at a concentration of from about 40 to 150 grams per liter and less than about 10 grams per liter of copper and less than about 10 grams per liter of silver.

7. A process for producing fine particle size cobalt metal powder from scrap material according to claim 2 wherein after forming said cobalt ammine chloride solution and prior to forming a cobalt containing precipitate, a cobaltic hexammine halide precipitate is formed, removing said cobaltic hexammine precipitate from the resulting aqueous solution to remove impurities, dissolving said cobaltic hexammine halide precipitate in an aqueous solution to form a relatively pure solution with a sufficient amount of metallic hydroxide to form said cobalt containing precipitate.

* * * * *